(12) United States Patent
Yanagida et al.

(10) Patent No.: US 8,083,285 B2
(45) Date of Patent: Dec. 27, 2011

(54) SIDE UNDER SPOILER MOUNTING STRUCTURE

(75) Inventors: Takayuki Yanagida, Niiza (JP); Yoshimasa Misonou, Niiza (JP); Hideomi Tamai, Niiza (JP)

(73) Assignee: Honda Access Corporation, Niiza-shi, Saitama-ken (JP)

( * ) Notice: Subject to any disclaimer, the term of this patent is extended or adjusted under 35 U.S.C. 154(b) by 328 days.

(21) Appl. No.: 12/394,745

(22) Filed: Feb. 27, 2009

(65) Prior Publication Data

US 2010/0078534 A1 Apr. 1, 2010

(30) Foreign Application Priority Data

Sep. 29, 2008 (JP) .................................. 2008-250468

(51) Int. Cl.
*B60R 13/00* (2006.01)
(52) U.S. Cl. ....... 296/181.5; 296/209; 296/29; 296/1.08
(58) Field of Classification Search ................ 296/180.1, 296/181.5, 199, 209, 29, 35.1, 1.08
See application file for complete search history.

(56) References Cited

U.S. PATENT DOCUMENTS

| | | | | |
|---|---|---|---|---|
| 4,607,878 | A | * | 8/1986 | Itoh ................. 296/199 |
| 6,102,473 | A | * | 8/2000 | Steininger et al. ............ 296/209 |
| 6,139,089 | A | * | 10/2000 | Troyer ....................... 296/180.1 |
| 6,318,045 | B1 | | 11/2001 | Kress |
| 6,685,255 | B2 | * | 2/2004 | Kasahara .................... 296/180.1 |
| 6,948,753 | B2 | * | 9/2005 | Yoshida et al. ............... 296/1.08 |
| 7,144,075 | B2 | * | 12/2006 | Shishikura ................... 296/209 |
| 7,523,982 | B2 | * | 4/2009 | Yamaguchi .................... 296/209 |
| 7,665,795 | B2 | * | 2/2010 | Shishikura ................. 296/180.1 |
| 2003/0102693 | A1 | | 6/2003 | Lydan et al. |
| 2009/0267373 | A1 | * | 10/2009 | Gerndorf et al. ............. 296/1.08 |

FOREIGN PATENT DOCUMENTS

| | | |
|---|---|---|
| GB | 2412633 A | 10/2005 |
| JP | 9-263189 A | 10/1997 |
| JP | 3362848 | 10/2002 |
| JP | 2005-313860 A | 11/2005 |
| JP | 2007-30641 A | 2/2007 |
| WO | 93/01954 A1 | 2/1993 |

OTHER PUBLICATIONS

Search Report dated May 1, 2009, issued in corresponding United Kingdom Patent Application No. GB0903502.3.

* cited by examiner

*Primary Examiner* — Jason S Morrow
(74) *Attorney, Agent, or Firm* — Westerman, Hattori, Daniels & Adrian, LLP (57) ABSTRACT

Because a vehicle lower portion 6 and a bracket 3 have an equal level of thermal expansion or thermal contraction, a bonded surface of the bracket 3 can be prevented from losing the bond with the vehicle lower portion 6 due to any deformation difference that might be caused if they have different thermal expansion coefficients. A side under spoiler 4 can be kept supported on the bracket 3 even if the side under spoiler 4 thermally expands or thermally contracts, and hence the side under spoiler 4 made of a different material from that of a vehicle body 2 can be more securely mounted on the vehicle body 2. The bracket 3 and the side under spoiler 4 after mounted can maintain their ability to be joined to the vehicle body 2 for a long term.

3 Claims, 14 Drawing Sheets

SIDE UNDER SPOILER MOUNTING STRUCTURE

BACKGROUND OF THE INVENTION

1. Field of the Invention

The present invention relates to a side under spoiler mounting structure, which is suitable for use in mounting a side under spoiler, which extends in the front-rear direction of a vehicle body, to a side surface of the vehicle body.

2. Description of the Related Art

There has conventionally been known a vehicle trim piece (side under spoiler mounting structure) that includes a lengthy base that is bonded to a vehicle body with a double-stick tape, a decorative hollow cover (hereinafter referred to simply as cover) that is flexible and extends along the base, and a means provided on the cover and the base for joining the cover to the base in a snap-on manner (see, e.g., Japanese Patent Publication No. 3362848).

There has also been known a side under spoiler mounting structure embodied by a bracket that is lengthy in the front-rear direction of a vehicle body and bonded to the vehicle body with a double-stick tape, and that mounts a side under spoiler to the vehicle body by allowing the side under spoiler to be moved in the front-rear direction of the vehicle body so that a supporting portion of the bracket and an attachment portion of the side under spoiler engage (see, e.g., Unexamined Japanese Patent Application No. 2005-313860).

SUMMARY OF THE INVENTION

In the side under spoiler mounting structures having the configurations described above, with a view to obtaining a lightweight body, the side under spoiler is generally made of such a material as synthetic resin, which is different from a material such as a metal material that makes up the vehicle body, and which thus has a different thermal expansion coefficient from that of the vehicle body.

Hence, these side under spoiler mounting structures are at a risk that the double-stick tape that bonds the bracket to the vehicle body might peel off due to deformation of the bracket and the vehicle body caused by a difference in how they thermally expand when the temperatures of the vehicle body, the bracket, and side under spoiler rise as the ambient temperature changes, raising a problem that the bracket and the side under spoiler cannot maintain their ability to be joined to the vehicle body for a long term.

The present invention was made in view of such circumstances, and an object of the present invention is to provide a side under spoiler mounting structure that can mount a side under spoiler made of a different material from that of a vehicle body to the vehicle body more firmly, and that can allow a bracket and a side under spoiler after mounted to maintain, for a long term, their ability to be joined to the vehicle body.

To solve the problem described above, the invention according to the first aspect is a side under spoiler mounting structure that mounts a side under spoiler to a lower portion of a vehicle via a bracket, wherein the bracket is made of a material having a similar thermal expansion coefficient to that of the lower portion of the vehicle, formed to be lengthy in the front-rear direction of the vehicle, bonded to the lower portion of the vehicle, and has an insertion groove that supports the side under spoiler, and the side under spoiler has an attachment portion that engages with the insertion groove of the bracket.

According to the first aspect of the invention, since the lower portion of the vehicle and the bracket have an equal level of thermal expansion or thermal contraction, a bonded surface of the bracket can be prevented from losing the bond with the lower portion of the vehicle due to any deformation difference that may be caused if the bracket and the lower portion of the vehicle have different thermal expansion coefficients. The side under spoiler, which is engaged with the bracket, can be kept supported on the bracket even if the side under spoiler thermally expands or thermally contracts, so the side under spoiler that is made of a different material from that of the vehicle body can be more firmly mounted on the vehicle body. Hence, the bracket and the side under spoiler after mounted can maintain their ability to be joined to the vehicle body for a long term.

2. The side under spoiler mounting structure according to claim 1, wherein the bracket is made of a material that thermally expands or thermally contracts equally to how the lower portion of the vehicle thermally expands or thermally contracts.

In the side under spoiler mounting structure, the bracket may be made of a material having a thermal expansion coefficient that is different from a thermal expansion coefficient of the lower portion of the vehicle by one digit at most.

In the side under spoiler mounting structure, the attachment portion of the side under spoiler may be restricted against move in the insertion groove of the bracket only in a vertical direction of the vehicle and in a width direction of the vehicle.

In the side under spoiler mounting structure, the side under spoiler may be supported on the bracket, by an engaging click formed on the attachment portion engaging with an engaging boss that protrudes in the insertion groove of the bracket.

In the side under spoiler mounting structure, the side under spoiler may be made of a material that thermally expands or thermally contracts differently from how the bracket thermally expands or thermally contracts.

DETAILED DESCRIPTION OF THE PREFERRED EMBODIMENTS

One embodiment of the present invention will be specifically described below with reference to the drawing.

Figure 1:
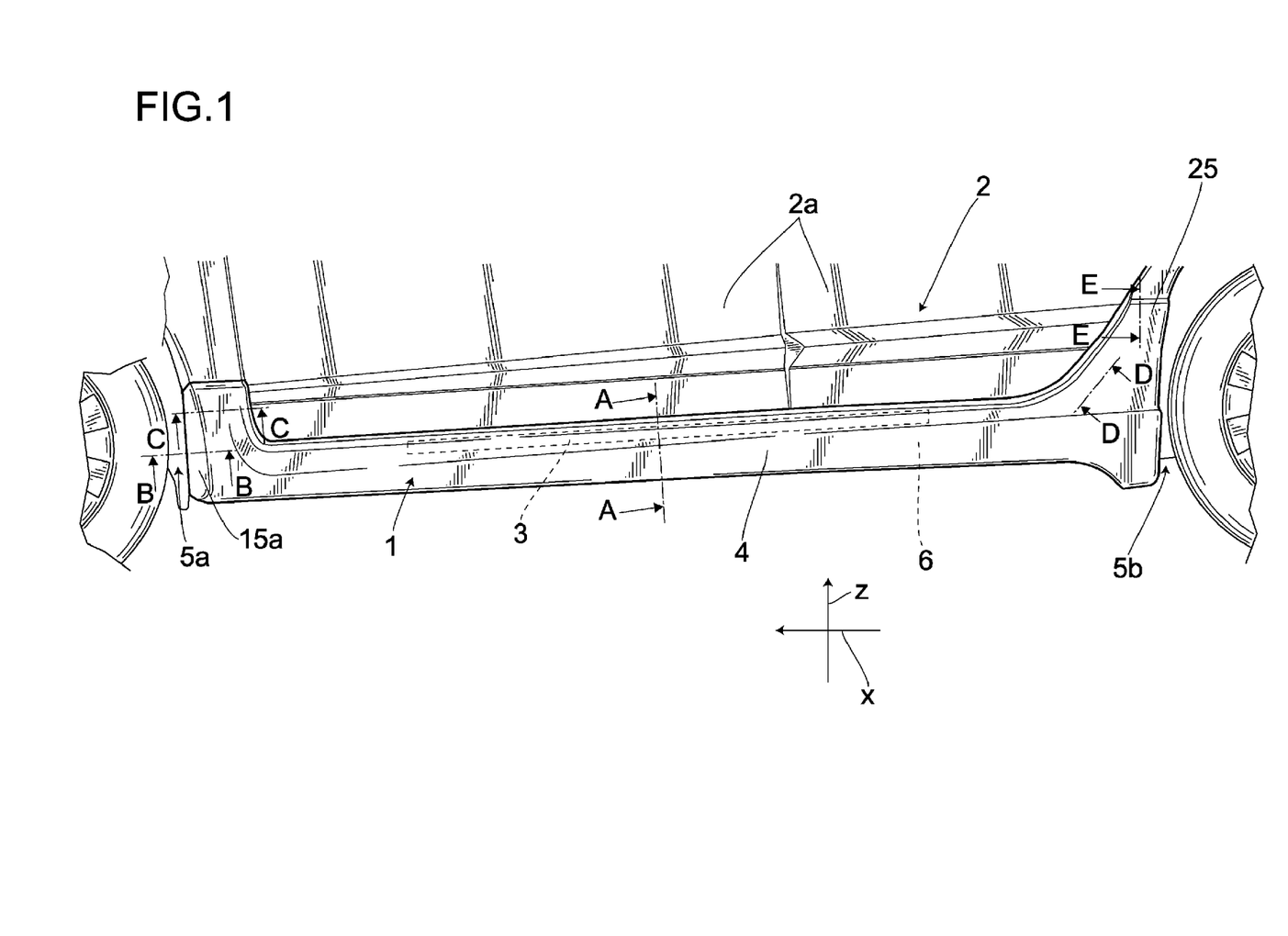
FIG. 1 is a schematic diagram that shows the whole configuration of a side under spoiler mounting structure according to the present invention.

In FIG. 1, the reference numeral "1" denotes a side under spoiler mounting structure provided on a side surface of a vehicle body 2. The side under spoiler mounting structure 1 includes a bracket 3 and a side under spoiler 4.

In a practical sense, the side under spoiler mounting structure 1 may be provided on a frame portion 6 at the lower portion of doors 2a (this frame portion 6 will hereinafter be referred to as vehicle lower portion) between a front wheel house 5a and a rear wheel house 5b, such that the bracket 3 and the side under spoiler 4 extends along a vehicle front-rear direction x.

Figure 2A:
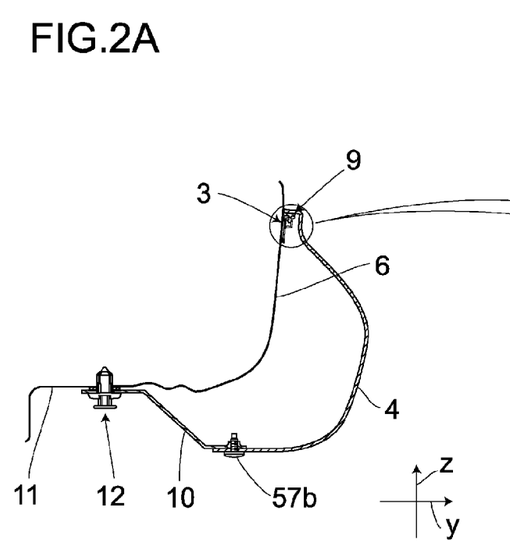
FIGS. 2(A) and 2(B) are cross sections that show a cross sectional configuration of the side under spoiler mounting structure taken between the positions A and A of FIG. 1 along with its partly enlarged view as shown in FIG. 2a, and a cross sectional configuration of the side under spoiler mounting structure taken between other positions.

First, how the side under spoiler 4 is mounted on the vehicle lower portion 6 will be briefly explained. As shown in FIG. 2(A), which shows a vertical cross section taken between the positions of the symbols A and A of FIG. 1 that are substantially along a vehicle vertical direction z perpendicular to the vehicle front-rear direction x, the side under spoiler 4 may have its center portion mounted to the vehicle lower portion 6 with its attachment portion 9 at its upper end engaging with the bracket 3, which is bonded to the vehicle lower portion 6 via a double-stick adhesive tape 7, and may have its lower end portion relayed by plate-like mounting hardware 10 to be fixed on a vehicle bottom surface 11 by a fixing clip 12. In FIG. 2(A), the letter y indicates a vehicle width direction that is perpendicular to the vehicle front-rear direction x and the vehicle vertical direction z.

Figure 2B:
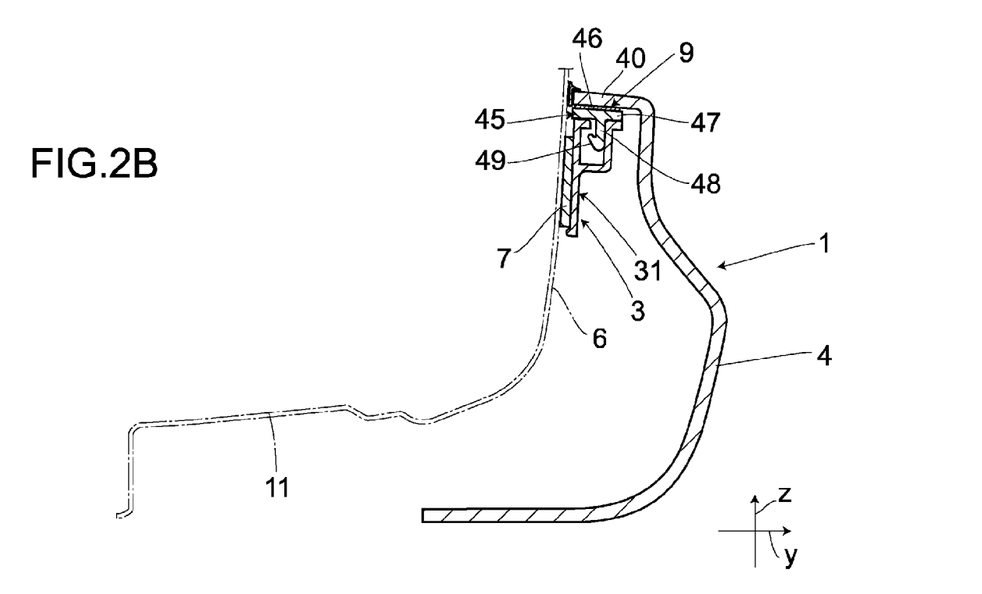

As shown in FIG. 2(B), the side under spoiler 4 is formed such that its attachment portion 9 that engages with the bracket 3 is wholly disposed at its upper end portion, and its lower end portion at the opposite side is a free end in the absence of the mounting hardware 10 (FIG. 2(A)), so that the side under spoiler 4 can move freely when receiving an external force applied to its lower end portion and thereby absorb the shock.

Figure 3:
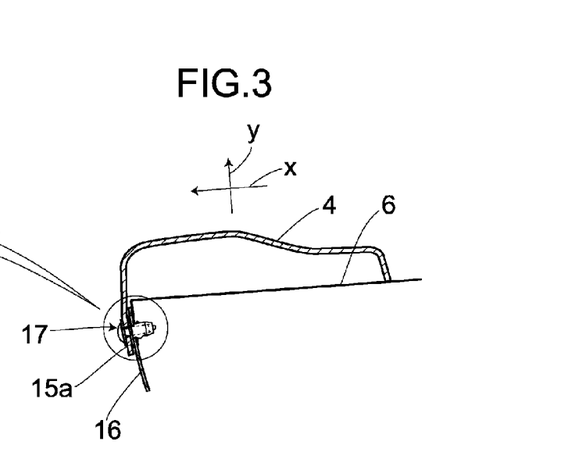
FIG. 3 is a cross section, with a partly enlarged view FIG. 3a, which shows a cross sectional configuration of the side under spoiler mounting structure taken between the positions B and B of FIG. 1.
Figure 3A:
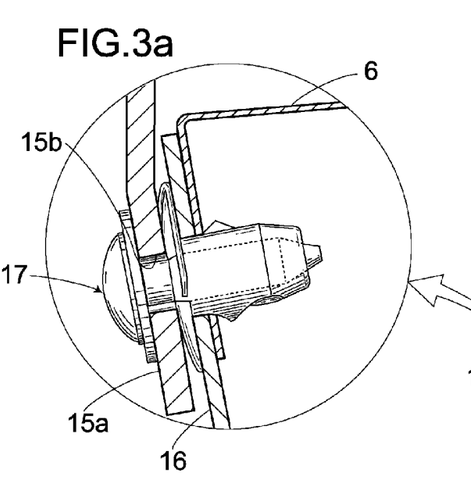
Figures 4, 4A:
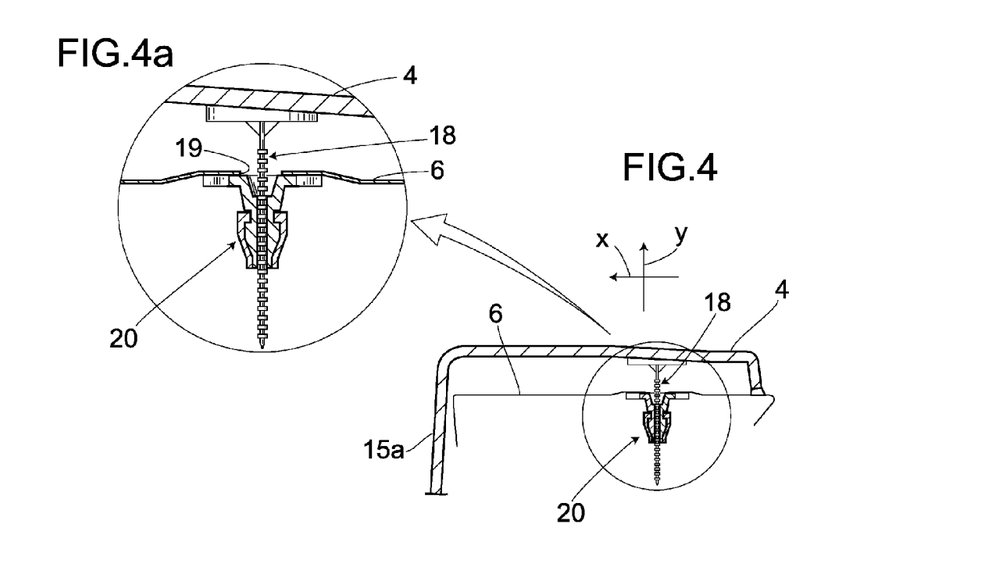
FIG. 4 is a cross section, with a partly enlarged view FIG. 4a, which shows a cross sectional configuration of the side under spoiler mounting structure taken between the positions C and C of FIG. 1.

As shown in FIG. 3, which shows a horizontal cross section taken between the positions of the symbols B and B of FIG. 1, the side under spoiler 4 has its front end portion 15a at the front portion of the vehicle fixed on an outer portion 16 of the front wheel house 5a by tapping screws 17 that are inserted into through holes 15b formed in the side under spoiler 4. Further, as shown in FIG. 4, which shows a horizontal cross section taken between the positions of the symbols C and C of FIG. 1, the side under spoiler 4 is fixed onto the vehicle lower portion 6 with a male clip 18, which is provided on the back of the front side surface of the side under spoiler 4, inserted into a fixing hole 19 formed in the vehicle lower portion 6, and with a female clip 20 attached to the tip of the male clip 18 that protrudes from the back surface of the vehicle lower portion 6.

Figure 5:
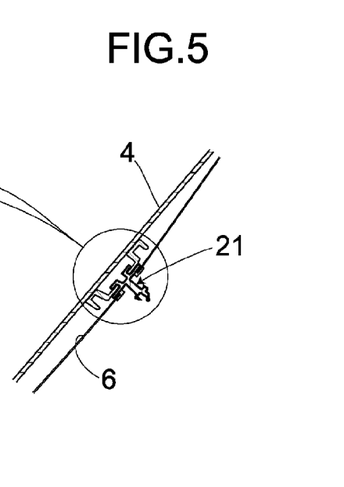
FIG. 5 is a cross section, with a partly enlarged view FIG. 5a, which shows a cross sectional configuration of the side under spoiler mounting structure taken between the positions D and D of FIG. 1.
Figure 5A:
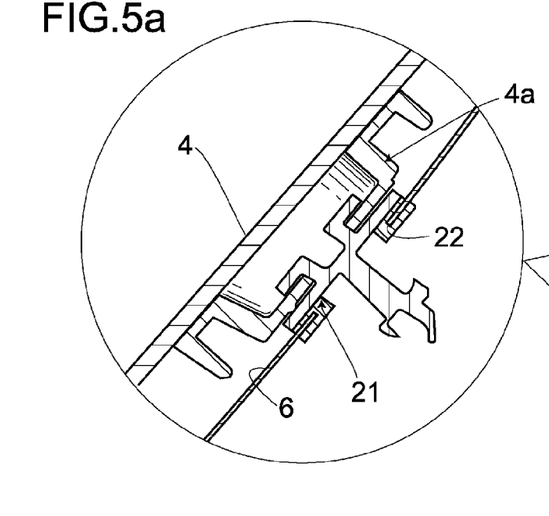
Figure 6:
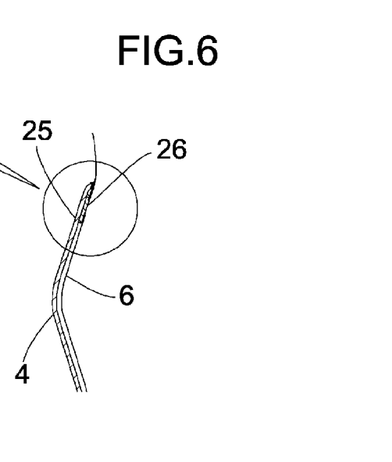
FIG. 6 is a cross section, with a partly enlarged view FIG. 6a, which shows a cross sectional configuration of the side under spoiler mounting structure taken between the positions E and E of FIG. 1.
Figure 6A:
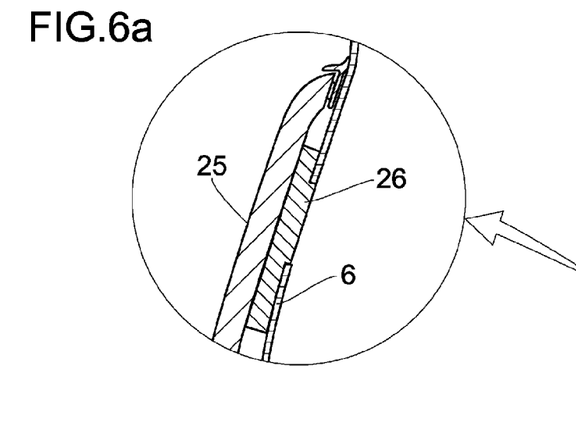

Furthermore, as shown in FIG. 5, which shows an oblique cross section taken between the positions of the symbols D and D of FIG. 1, the side under spoiler 4 has its rear end portion fixed to the vehicle lower portion 6 with a fixing clip 21, which is attached to its clip attachment portion 4a on the back of its rear side surface, fitted into a fixing hole 22 formed in the vehicle lower portion 6. Still further, as shown in FIG. 6, which shows a vertical cross section taken between the positions of the symbols E and E of FIG. 1, the side under spoiler 4 has its rear side surface upper portion 25 bonded to the vehicle lower portion 6 by a double-stick adhesive tape 26 bonded to the back of the rear side surface upper portion 25.

In this manner, the side under spoiler 4 has its front end portion 15a, its front side surface, and its rear side surface fixed to the vehicle lower portion 6 by the tapping screws 17, the male clip 18 and female clip 20, and the fixing clip 21 respectively, has its rear side surface upper portion 25 bonded to the vehicle lower portion 6 by the double-stick adhesive tape 26, and has its center portion mounted to the vehicle lower portion 6 as engaged with the bracket 3.

Figure 7:
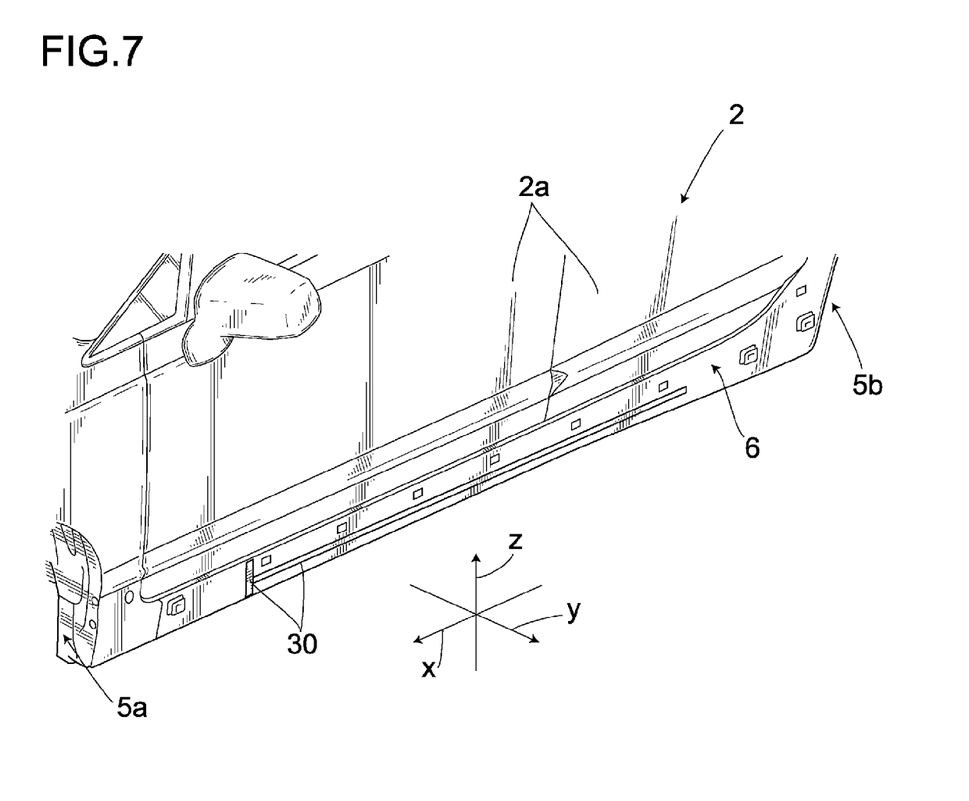
FIG. 7 is a schematic diagram that shows the configuration of a vehicle lower portion.

As shown in FIG. 7, the vehicle lower portion 6 has a smooth surface, such that the lengthy bracket 3 (unillustrated) can be securely bonded to the surface by the double-stick adhesive tape 7. The reference numeral "30" denotes a masking tape that indicates the region to which the bracket 3 is to be bonded.

Figure 8:
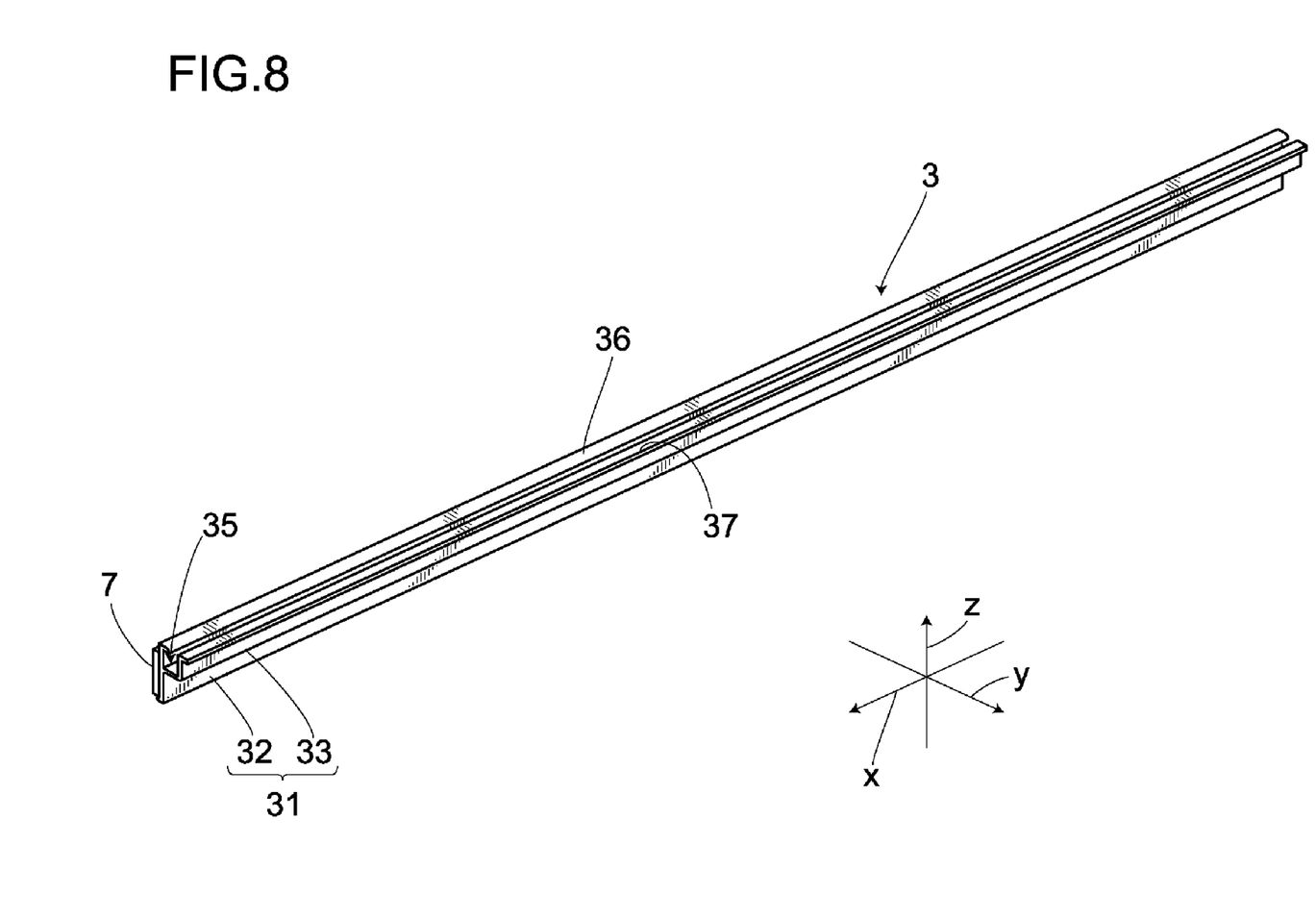
FIG. 8 is a schematic diagram that shows the whole configuration of a bracket.

As shown in FIG. 8, the bracket 3 includes a bracket body 31, which is a single molded piece, and the belt-like double-stick adhesive tape 7 bonded to one side surface of the bracket body 31. The bracket body 31 is made of a material that has a similar thermal expansion coefficient to that of the material of which the vehicle lower portion 6 is made (the latter material will hereinafter be referred to simply as vehicle material). In the present embodiment, the vehicle material is, e.g., a metal material, so the bracket body 31 is made of an aluminum material having a similar thermal expansion coefficient to that of this metal material.

Here, a similar thermal expansion coefficient to that of the vehicle material refers to a thermal expansion coefficient that is different from the thermal expansion coefficient of the vehicle material by one digit at most. That is, in a case where the vehicle material is, e.g., a metal material, whose thermal expansion coefficient is about $12 \times 10^{-6}/°C.$, the bracket body 31 may be made of a material having a thermal expansion coefficient of $N \times 10^{-5}/°C.$ at the maximum to $N \times 10^{-7}/°C.$ (where N is an arbitrary two-digit number).

Figure 9:
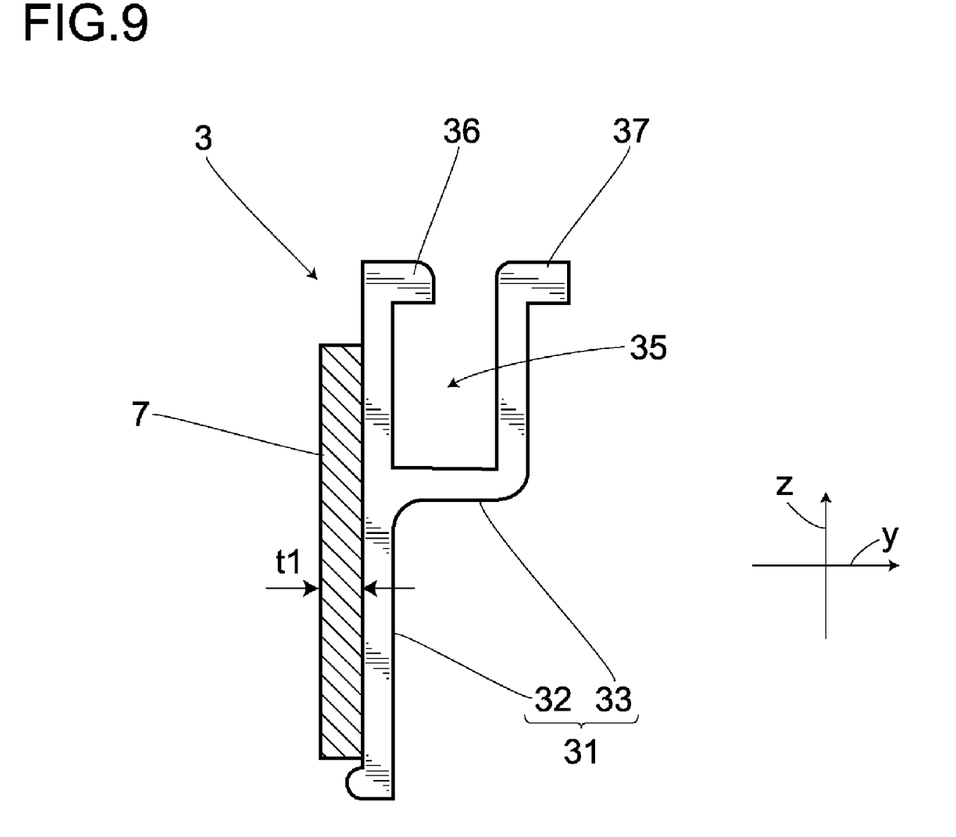
FIG. 9 is a schematic diagram that shows a lateral configuration of the bracket.

In a practical sense, the bracket body 31 has a belt-like plate member 32 whose height in the vehicle vertical direction z is about 26 mm, whose length in the vehicle front-rear direction x is about 1100 mm, and whose thickness is about 1.5 mm. As shown in FIG. 9, a bent member 33 having an L-shaped cross section is provided on the other side surface of the plate member 32 such that one end of the bent member 33 stands thereon. Hence, the side of the bent member 33 is substantially parallel with the plate member 32 so that an insertion groove 35, into which the attachment portion 9 of the side under spoiler 4 is to be accommodated, is formed in the bracket body 31 between the side of the bent member 33 and the plate member 32, such that the insertion groove 35 extends in the vehicle front-rear direction x (FIG. 8).

As shown in FIG. 9, the bracket body 31 further has an engaging boss 36, which is formed at the upper end of the plate member 32 to protrude toward the bent member 33, and a rest 37, which is formed at the upper end of the bent member 33 to protrude in the same direction as the engaging boss 36.

Hence, as shown in FIG. 2(A), the bracket 3 receives parts of the attachment portion 9 of the side under spoiler 4 on the upper surface of the engaging boss 36 and rest 37 to set the attachment portion 9 in position, and engages the attachment portion 9 inserted in the insertion groove 35 with the engaging boss 36.

The double-stick adhesive tape 7 bonded to the bracket body 31 has a height of about 20 mm in the vehicle vertical direction z and a length of about 1100 mm in the vehicle front-rear direction x to be formed into a belt-like shape, and as shown in FIG. 9, a thickness t1 of about 2.0 mm, and can be bonded to the plate member 32 that extends in the vehicle front-rear direction x.

Figure 10:
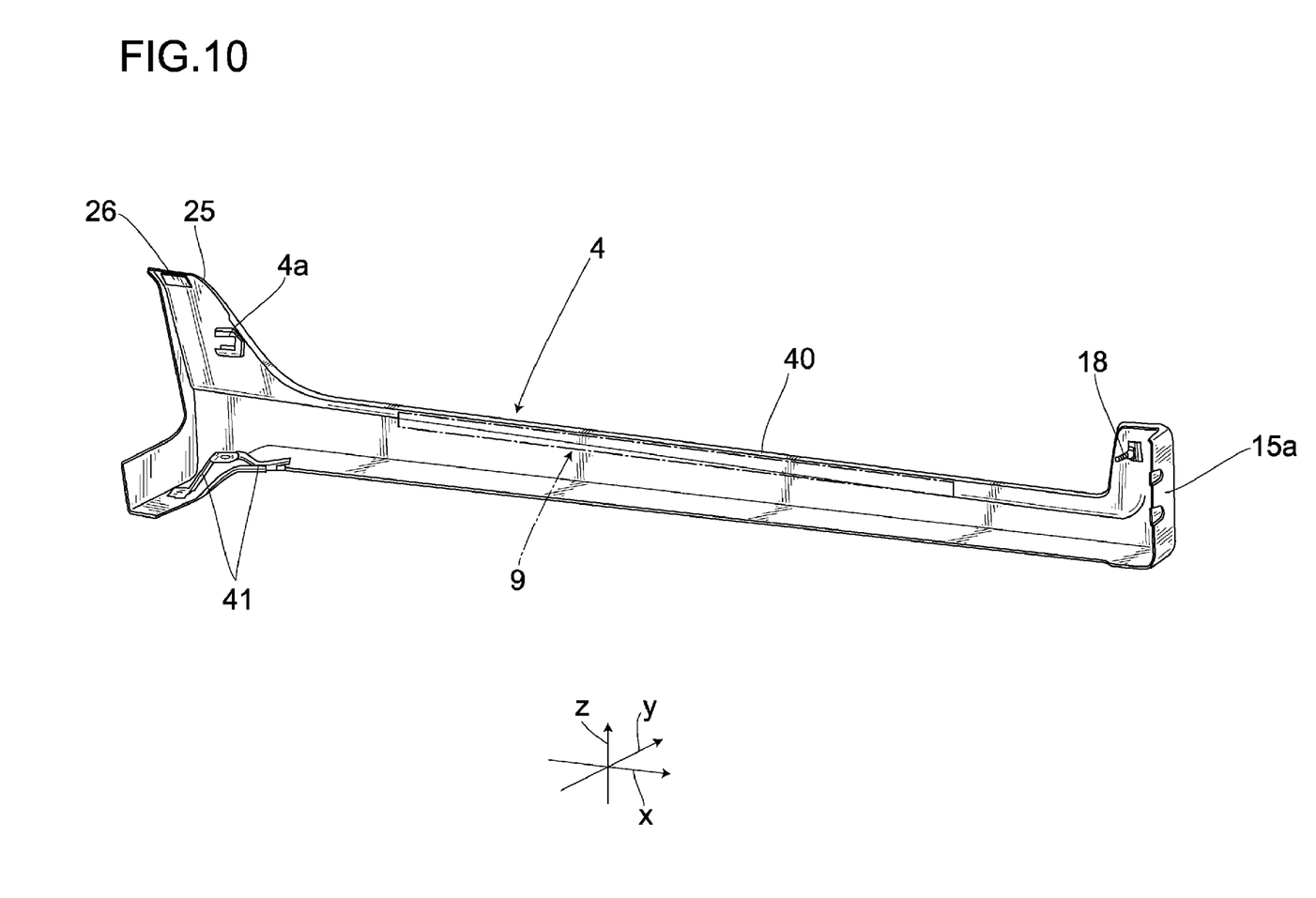
FIG. 10 is a schematic diagram that shows the whole configuration of the side under spoiler.

Meanwhile, as shown in FIG. 10, the side under spoiler 4 is made of a synthetic resin such as Poly Phenylene Ether (PPE) and shaped into a lengthy form, and can be mounted on the outer bailey of the vehicle lower portion 6 via its back surface. The side under spoiler 4 has its side surface at its upper end in the center portion folded to protrude toward the vehicle body to form a protruding upper end 40, on whose back surface the attachment portion 9 is provided (FIG. 2(A)). The reference numeral "41" denotes fixing hardware that fixes the rear side portion of the side under spoiler 4 to the vehicle bottom surface 11.

The double-stick adhesive tape 26 on the rear side surface upper portion 25 of the side under spoiler 4 has a thickness of about 2.5 mm, which is selected to be larger than the thickness of the double-stick adhesive tape 7 on the bracket 3 to make the double-stick adhesive tape 26 with this larger thickness prevent the side under spoiler 4 and the vehicle lower portion 6 that have different thermal expansion coefficients from being deformed by a temperature change and producing a clearance between them.

Figure 11:
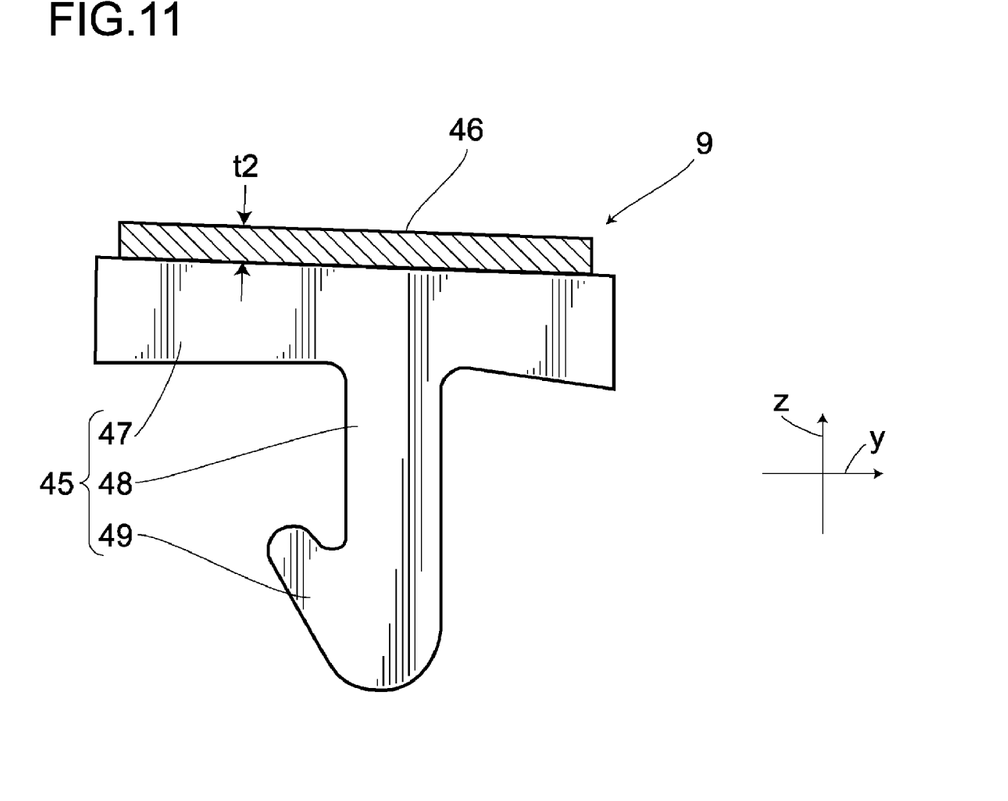
FIG. 11 is a schematic diagram that shows a lateral configuration of an attachment portion.

The attachment portion 9 has a lengthy form substantially as long as the bracket 3, and as shown in FIG. 11, includes an engaging portion 45 and a double-stick adhesive tape 46. The engaging portion 45 is a single molded piece made of a material (e.g., a synthetic resin such as Thermo Poly Olefin (TPO)) that has a similar thermal expansion coefficient to that of the side under spoiler 4.

In a practical sense, the engaging portion 45 is constituted by a plate-like supporting portion 47, an insertion protruding portion 48 that hangs downward from about the center of the lower surface of the supporting portion 47, and an engaging click 49, which is the tip of the insertion protruding portion 48 folded to protrude in one direction. The double-stick adhesive tape 46 is bonded to the upper surface of the belt-like supporting portion 47.

The engaging portion 45 is bonded to the back surface of the protruding upper end 40 of the side under spoiler 4 by the double-stick adhesive tape 46 bonded to the upper surface of the supporting portion 47, such that the engaging click 49 can be set to protrude toward the vehicle body 2 (FIG. 2(A)).

The double-stick adhesive tape 46 has a width of about 11 mm in the vehicle width direction y, a length of about 1100 mm in the vehicle front-rear direction x, and as shown in FIG. 11, a thickness t2 of about 0.8 mm, which is smaller than the thickness of the double-stick adhesive tape 26 provided on the side under spoiler 4. The thickness t2 of the double-stick adhesive tape 46 is made smaller than that of the double-stick adhesive tape 26 provided on the side under spoiler 4 because the engaging portion 45, which is made of a material having a similar property to the side under spoiler 4, has substantially no difference from the side under spoiler 4 in how it deforms in response to a temperature change, thus making a clearance less likely to be produced between the engaging portion 45 and the side under spoiler 4 even without making the thickness t2 large.

Hence, as shown in FIG. 2(A), with the insertion protruding portion 48 and the engaging click 49 inserted into the insertion groove 35 of the bracket 3, the engaging portion 45 can be prevented from slipping out of the insertion groove 35 when the side under spoiler 4 moves idly in the vehicle vertical direction z or in the vehicle width direction y, because the engaging click 49 that protrudes toward the engaging boss 36 engages with the engaging boss 36 or the insertion protruding portion 48 hits on bent member 33.

In addition, the engaging portion 45 is structured such that the engaging click 49 is positioned inside the insertion groove 35 with a slight distance from the engaging boss 36 provided on the upper end of the insertion groove 35 so that the engaging click 49 engages with only the engaging boss 36 as needed in response to an idle movement of the side under spoiler 4. Accordingly, while having protection against slip out from the insertion groove 35, the attachment portion 9 allows the engaging portion 45 to move in the vehicle front-rear direction x relative to the insertion groove 35 to follow any deformation of the side under spoiler 4 that might occur in the vehicle front-rear direction x due to thermal expansion or thermal contraction of the side under spoiler 4.

Figure 12A:
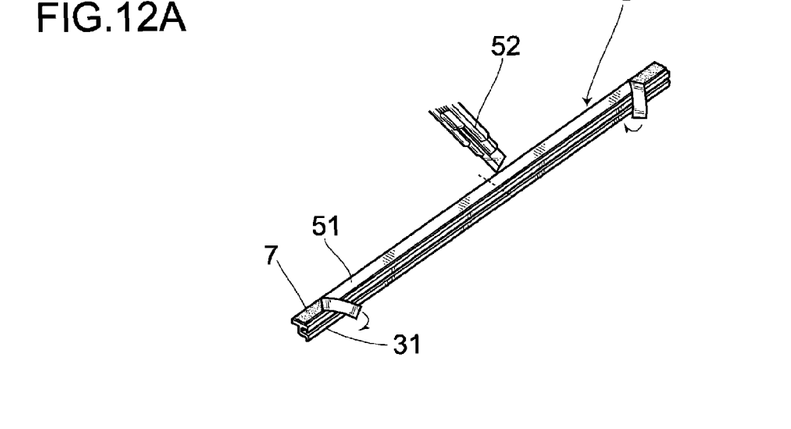
FIGS. 12(A) to 12(C) are schematic diagrams that show how the bracket is mounted on the vehicle lower portion.

Next, a work process for assembling such a side under spoiler mounting structure 1 onto the vehicle lower portion 6 will be explained. As shown in FIG. 12(A), an assembly worker (unillustrated) forms a slit in the center of an exfoliate paper 51 of the double-stick adhesive tape 7 of the bracket 3 by a cutter 52 and peels the exfoliate paper 51 from the double-stick adhesive tape 7 at both ends.

Figure 12B:
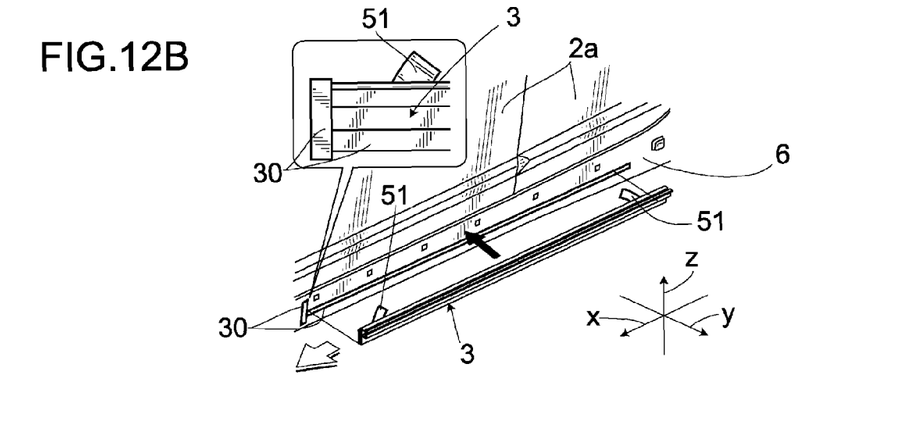
Figure 12C:
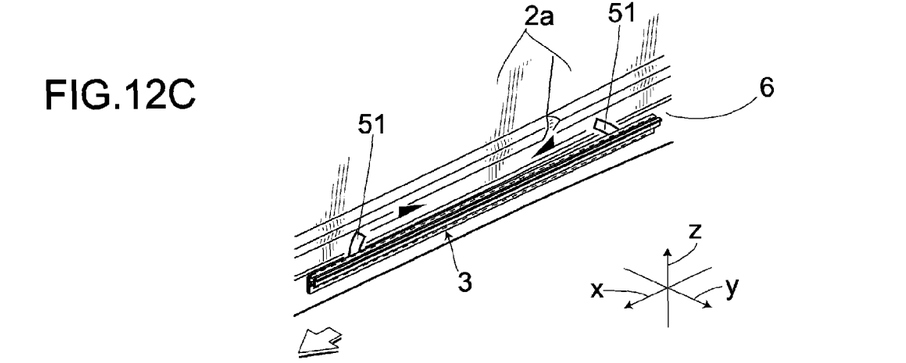

Then, the assembly worker brings the bracket 3 to face the masking tape 30 provided on the vehicle lower portion 6 to set the longer dimension of the bracket 3 in line with the vehicle front-rear direction x as shown in FIG. 12(B), and presses the bracket 3 fixed onto the vehicle lower portion 6 while peeling the exfoliate paper 51 from both sides thereof as shown in FIG. 12(C). As a result, the bracket 3 can be fixed on the vehicle lower portion 6 via the double-stick adhesive tape 7.

Figure 13:
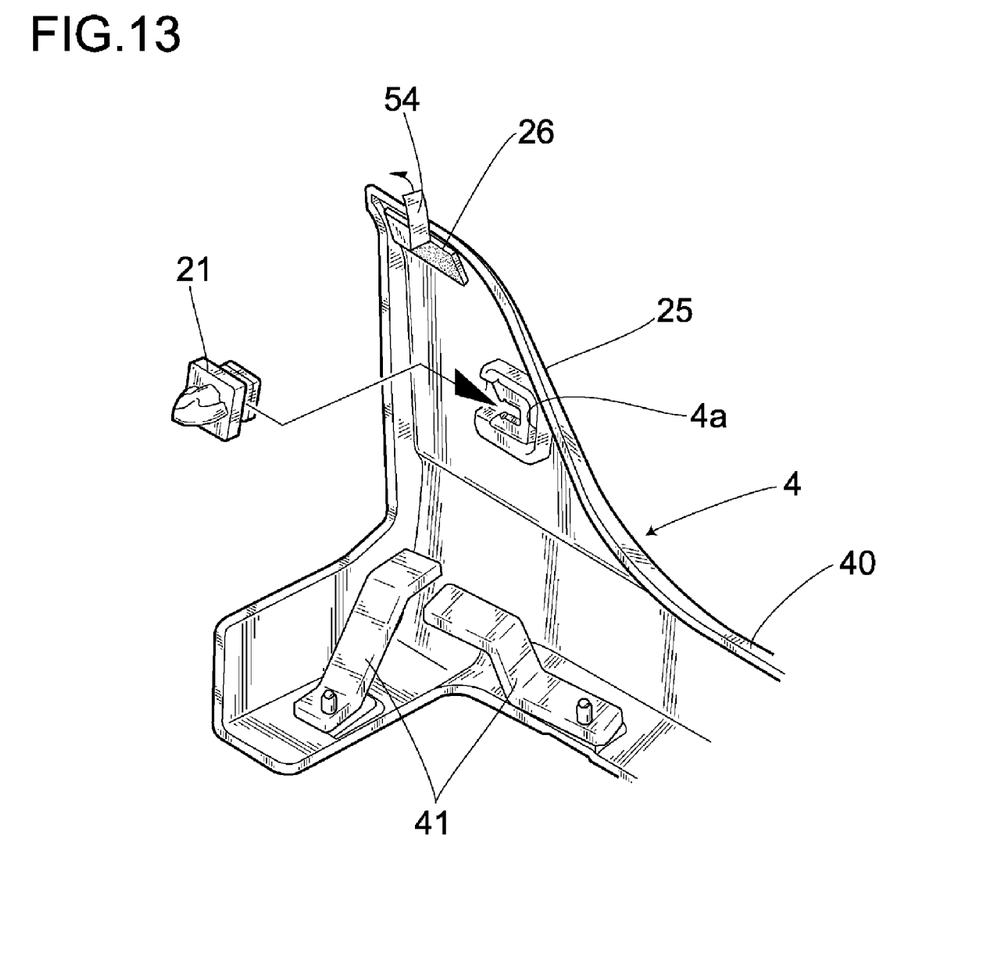
FIG. 13 is a schematic diagram that shows how a fixing clip is fitted into the side under spoiler.

Further, as shown in FIG. 13, the assembly worker inserts the fixing clip 21 into the clip attachment portion 4a provided at the rear end portion of the side under spoiler 4, and partially peels off an exfoliate paper 54 of the double-stick adhesive tape 26 bonded to the back of the rear side surface upper portion 25 of the side under spoiler 4.

Figure 14:
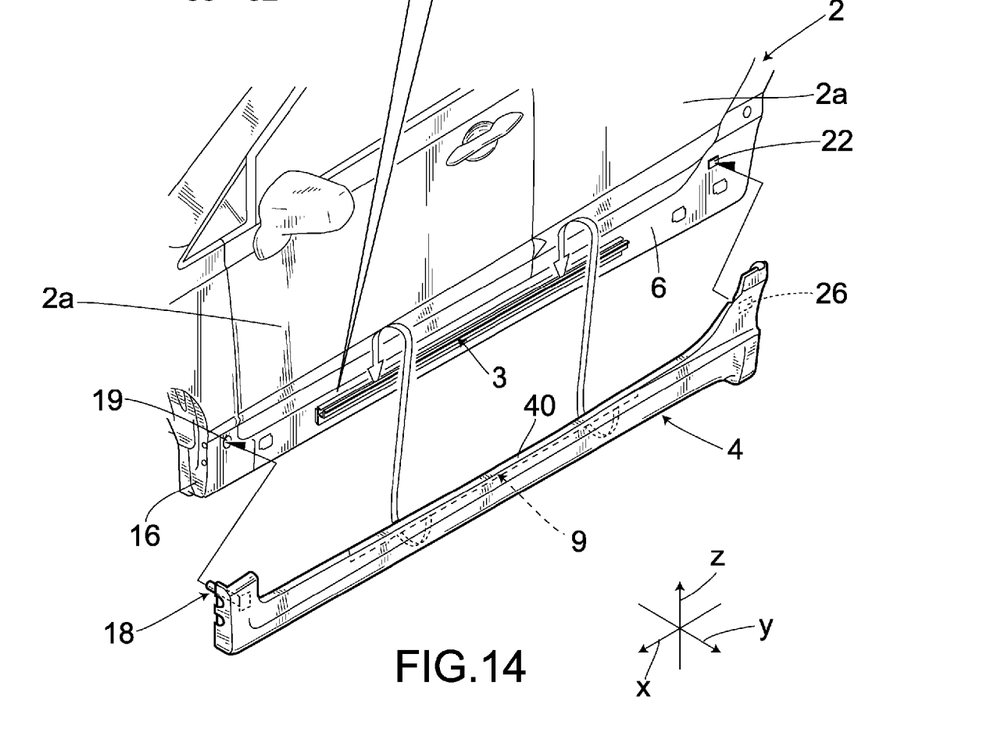
FIG. 14 is a schematic diagram, with partly enlarged explanatory views FIGS. 14a and 14b, which shows how the side under spoiler is mounted on the bracket.
Figure 14A:
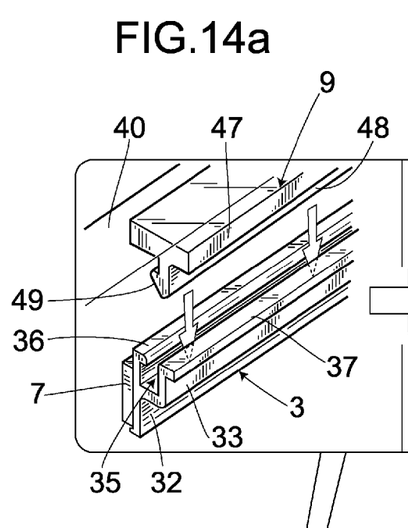
Figure 14B:
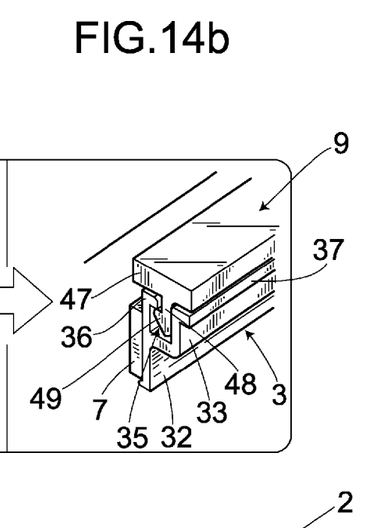

Next, as shown in FIG. 14, the assembly worker hooks the side under spoiler 4 on the bracket 3 bonded to the vehicle lower portion 6. At this time, the assembly worker inserts the insertion protruding portion 48 and engaging click 49 of the attachment portion 9 of the side under spoiler 4 into the insertion groove 35 of the bracket 3 from above the insertion groove 35 to fix the side under spoiler 4 onto the bracket 3 (see the pictures in the rectangular region above in FIG. 14).

Further, at this time, the assembly worker inserts the male clip 18 of the side under spoiler 4 into the fixing hole 19 formed in the front portion of the vehicle lower portion 6 and the fixing clip 21 of the side under spoiler 4 into the fixing hole 22 formed in the rear portion of the vehicle lower portion 6 to directly attach the side under spoiler 4 onto the vehicle lower portion 6.

Figure 15A:
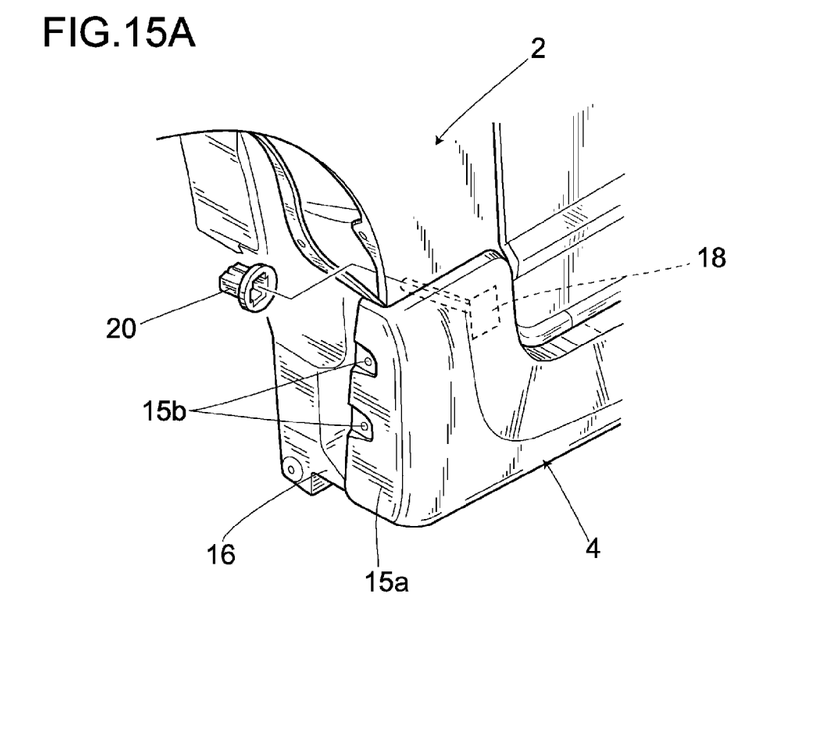
FIGS. 15(A) and 15(B) are schematic diagrams that show how the side under spoiler is mounted on the vehicle lower portion.

Next, as shown in FIG. 15(A), the assembly worker attaches the female clip 20 to the tip of the male clip 18 that protrudes from the back surface of the vehicle lower portion 6 to fix the side under spoiler 4 by sandwiching the vehicle lower portion 6 between the male clip 18 and the female clip 20.

Figure 15B:
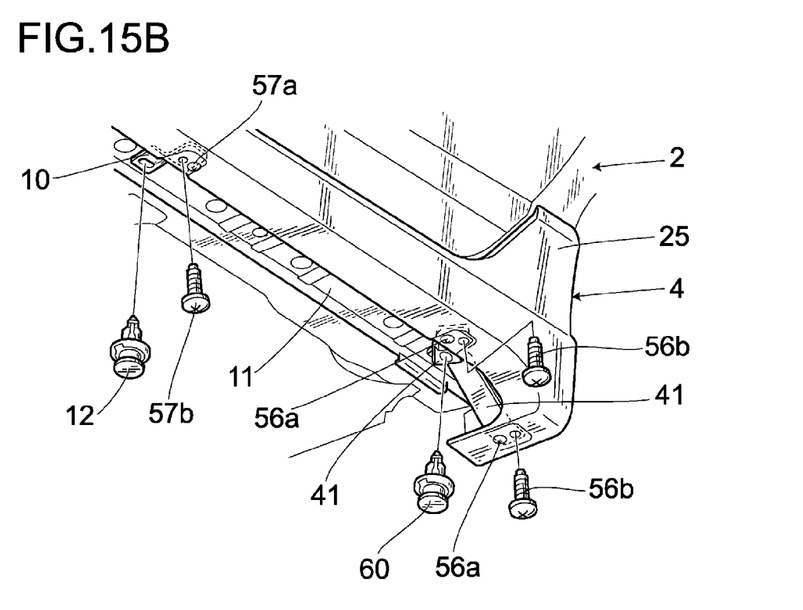

Then, as shown in FIG. 15(B), the assembly worker aligns the holes in the fixing hardware 41, through which the fixing hardware 41 is loosely threaded to the side under spoiler 4 by screws 56a, and the hole in the mounting hardware 10, through which the mounting hardware 10 is also loosely threaded to the side under spoiler 4 by a screw 57a such that the holes meet corresponding holes (unillustrated) formed in the vehicle bottom surface 11 respectively, and then fastens the mounting hardware 10 and the fixing hardware 41 onto the side under spoiler 4 by the screw 57a and the screws 56a.

Then, in this state, the assembly worker fits the fixing clip 12 and a fixing clip 60 via a rubber washer (unillustrated) into the mounting hardware 10 and the fixing hardware 41 to fix the mounting hardware 10 and the fixing hardware 41 to the vehicle bottom surface 11.

Figure 16:
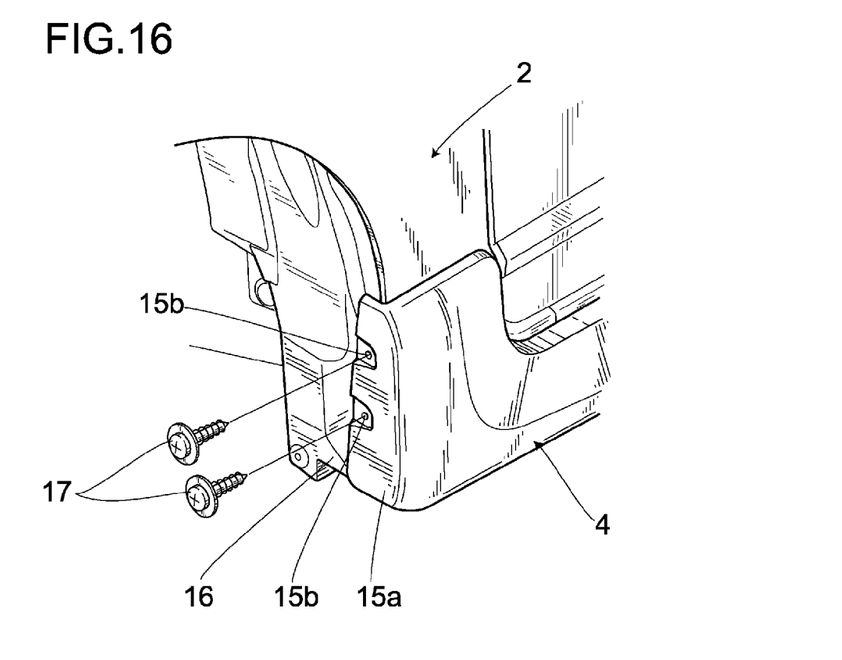
FIG. 16 is a schematic diagram that shows how the front end portion of the side under spoiler is mounted on the vehicle lower portion.

Further, as shown in FIG. 16, the assembly worker aligns the through holes 15b formed in the front end portion 15a of the side under spoiler 4 and holes (unillustrated) formed in the outer portion 16 of the front wheel house 5a, and fixes the front end portion 15a of the side under spoiler 4 to the outer portion 16 of the front wheel house 5a by threading the tapping screws 17 into these through holes 15b and holes.

Figure 17:
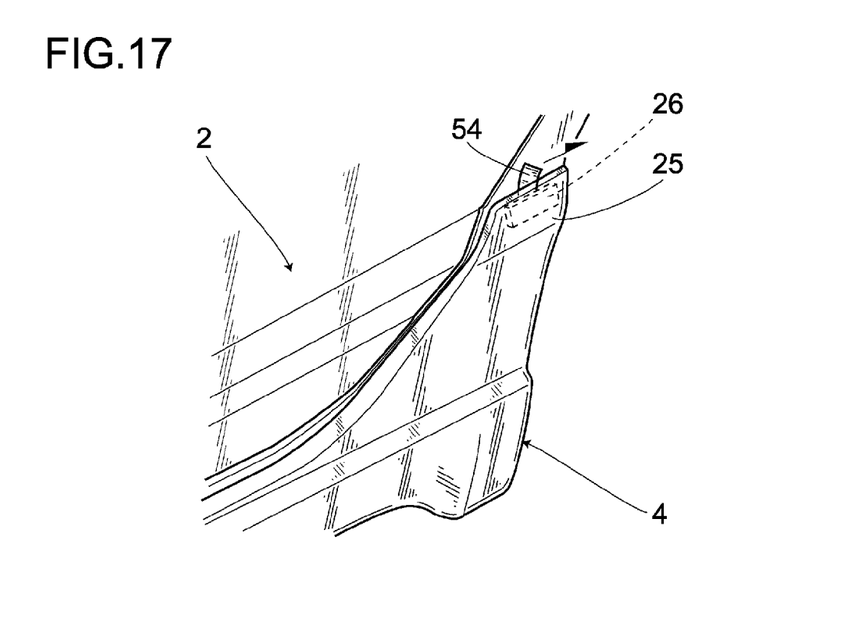
FIG. 17 is a schematic diagram that shows how the rear side surface upper portion of the side under spoiler is bonded to the vehicle lower portion by a double-stick adhesive tape.

Finally, as shown in FIG. 17, the assembly worker presses the double-stick adhesive tape 26 provided at the rear side surface upper portion 25 of the side under spoiler 4 onto the vehicle lower portion 6 while peeling off the exfoliate paper 54 of the double-stick adhesive tape 26 to bond the rear side surface upper portion 25 of the side under spoiler 4 to the vehicle lower portion 6. In this manner, the assembly worker fixes the side under spoiler 4 to the vehicle lower portion 6.

Since the above-described configuration, in which the bracket 3 bonded to the vehicle lower portion 6 by the double-stick adhesive tape 7 is made of a material having a similar thermal expansion coefficient to that of the vehicle lower portion 6, gives the vehicle lower portion 6 and the bracket 3 an equal level of thermal expansion or thermal contraction when an ambient temperature change causes any rise or fall of the temperatures of the vehicle lower portion 6 and the bracket 3, the side under spoiler mounting structure 1 can prevent the bracket 3 from falling off the vehicle lower portion 6 due to the double-stick adhesive tape 7 peeling off as a result of any deformation difference between the vehicle lower portion 6 and the bracket 3 that might be caused if they have different thermal expansion coefficients.

Further, the side under spoiler mounting structure 1 supports the side under spoiler 4 on the bracket 3, by inserting the attachment portion 9 of the side under spoiler 4 in the insertion groove 35 and engaging the attachment portion 9 with the insertion groove 35.

Hence, if the side under spoiler 4 is made of a material such as plastic, etc. that has a totally different thermal expansion coefficient from that of the vehicle lower portion 6 and the bracket 3 for it to be lightweight or for any other purpose, and hence causes a different level of thermal expansion or thermal contraction from that of the bracket 3 in response to an ambient temperature change, the side under spoiler mounting structure 1 can keep the side under spoiler 4 supported on the bracket 3.

Specifically, according to the present embodiment, the bracket 3 has the insertion groove 35 that extends in the vehicle front-rear direction x, and at the upper end of the insertion groove 35, the engaging boss 36 and rest 37 that extend in the vehicle front-rear direction x and protrude in the direction away from the vehicle body 2.

Further, the side under spoiler 4 is supported on the bracket 3 in a manner that, when the attachment portion 9 is inserted into the insertion groove 35 of the bracket 3 from above the insertion groove 35 and a force is applied to the attachment portion 9 by the own weight of the side under spoiler 4, the insertion protruding portion 48 of the attachment portion 9 hits on the bent member 33 of the insertion groove 35 and the supporting portion 47 of the attachment portion 9 is received on the engaging boss 36 and rest 37 of the insertion groove 35 (FIG. 2(A)).

Hence, since it is only in the vehicle vertical direction z and in the vehicle width direction y that the attachment portion 9 of the side under spoiler 4 is restricted against move in the insertion groove 35 of the bracket 3 and the engaging portion 45 is not locked in the vehicle front-rear direction x, the side under spoiler mounting structure 1 can mount the side under spoiler 4 onto the bracket 3 in a manner to allow the side under spoiler 4 to move in the vehicle front-rear direction x when the side under spoiler 4 thermally expands or thermally contracts.

Accordingly, even if the side under spoiler 4 thermally expands or thermally contracts and deforms in the vehicle front-rear direction x in response to a temperature change, the side under spoiler mounting structure 1 can keep the attachment portion 9 of the side under spoiler 4 and the insertion groove 35 of the bracket 3 in engagement.

Hence, even if the side under spoiler 4 is made of a material having a totally different thermal expansion coefficient from that of the material of the vehicle lower portion 6 and the bracket 3, the side under spoiler mounting structure 1 can securely keep the side under spoiler 4 supported on the bracket 3 regardless of thermal expansion or thermal contraction of the side under spoiler 4.

Furthermore, even if an external force is applied to the side under spoiler 4 in the vehicle vertical direction z and hence the side under spoiler 4 idly moves in the vehicle vertical direction z, the side under spoiler mounting structure 1 can securely prevent the side under spoiler 4 from slipping off from the bracket 3, by having the engaging click 49 of the attachment portion 9 of the side under spoiler 4 appropriately engaged with the engaging boss 36 of the insertion groove 35 of the bracket 3.

With the above-described configuration, in which the bracket 3 bonded to the vehicle lower portion 6 by the double-stick adhesive tape 7 is made of a material having a similar thermal expansion coefficient to that of the vehicle lower portion 6 and the attachment portion 9 of the side under spoiler 4 is inserted into the insertion groove 35 of the bracket 3 to be engaged therein, the bonded surface of the bracket 3 can be prevented from losing the bond with the vehicle lower portion 6 because the vehicle lower portion 6 and the bracket 3 have an equal level of thermal expansion or thermal contraction so they do not have any difference in how they deform that might be caused if they have different thermal expansion coefficients, and the side under spoiler 4 can be kept supported on the bracket 3 even if the side under spoiler 4 thermally expands or thermally contracts so the side under spoiler 4 made of a different material from that of the vehicle body 2 can be more securely mounted on the vehicle body 2, which are summarized as that the bracket 3 and the side under spoiler 4 after mounted can maintain their ability to be joined to the vehicle body 2 for a long term.

The present invention is not limited to the embodiment described above, but may be modified in various manners within the scope of the spirit of the present invention. For example, in the described case, an aluminum material is used as the material that has a similar thermal expansion coefficient to that of the vehicle material and the bracket 3 is made of this aluminum material. The present invention is not limited to this case, but the bracket 3 may be made of various other materials as long as such materials have a thermal expansion coefficient that is different from the thermal expansion coefficient of the vehicle material by one digit at most.

Further, in the embodiment described above, the side under spoiler is supported on the bracket 3 by the insertion protruding portion 48 of the attachment portion 9 hitting on the bent member 33 of the insertion groove 35 and the supporting portion 47 of the attachment portion 9 being received on the engaging boss 36 and rest 37 of the insertion groove 35 due to a force applied to the attachment portion 9 by the own weight of the side under spoiler 4. The present invention is not limited to this, but the side under spoiler 4 may be supported on the bracket 3 by, in addition, the engaging click 49 of the attachment portion 9 engaging with the engaging boss 36 of the insertion groove 35 due to a force applied to the attachment portion 9 by the own weight of the side under spoiler 4.

Furthermore, in the embodiment described above, the engaging click 49 of the engaging portion 45 protrudes toward the vehicle body 2. The present invention is not limited to this. The important thing is to have the engaging click 49 engaged with the engaging boss 36 that protrudes in the insertion groove 35, so the engaging click 49 of the engaging portion 45 may protrude in a direction away from the vehicle body 2 or in various directions. The engaging boss 36 with which the engaging click 49 engages may also protrude in various directions in the insertion groove 35.

What is claimed is:

1. A side under spoiler mounting structure, comprising:
a bracket to be mounted to a lower portion of a vehicle, the bracket being made of a metal material having a similar thermal expansion coefficient to that of the lower portion of the vehicle, being formed to be lengthy in a front-rear direction of the vehicle, being bondable to the lower portion of the vehicle, and having an insertion groove that supports the side under spoiler,
wherein the side under spoiler is made of a synthetic resin and has an attachment portion engaging with the bracket, the attachment portion being made of a material having a similar thermal expansion coefficient to that of the side under spoiler,
wherein an engaging portion of the attachment portion comprises an insertion protruding portion and an engaging click which are inserted into an insertion groove of the bracket, and
wherein the engaging click is positioned inside the insertion groove with a distance from an engaging boss provided on an upper end of said insertion groove, such that the engaging click engages with the engaging boss in response to an idle movement of the side under spoiler.

2. The side under spoiler mounting structure according to claim 1,
wherein the insertion protruding portion hangs downward from a plate-shaped supporting portion and the engaging click is a tip of the insertion protruding portion folded to protrude in one direction, and
wherein when the insertion protruding portion and the engaging click are inserted into the insertion groove of the bracket from above the insertion groove and a force is applied to the attachment portion by an own weight of the side under spoiler, (i) the insertion protruding portion of the engaging portion hits on a side wall of the insertion groove and (ii) a supporting portion of the engaging portion is received on the engaging boss and a rest adjacent to the insertion groove.

3. The side under spoiler mounting structure according to claim 1, wherein the bracket is made of a material having a thermal expansion coefficient that is different from a thermal expansion coefficient of the lower portion of the vehicle by one order of magnitude at most.

\* \* \* \* \*